United States Patent [19]

Endo et al.

[11] 4,441,755
[45] Apr. 10, 1984

[54] WINDOW MOLDING FOR AUTOMOBILE

[75] Inventors: Toshiaki Endo, Chigasaki; Kazuhiko Yoshiyuki, Yokohama, both of Japan

[73] Assignee: Nissan Motor Co., Ltd., Yokohama, Japan

[21] Appl. No.: 400,598

[22] Filed: Jul. 22, 1982

Related U.S. Application Data

[63] Continuation of Ser. No. 210,610, Nov. 26, 1980, abandoned.

[30] Foreign Application Priority Data

Nov. 28, 1979 [JP] Japan ............................... 54-154773

[51] Int. Cl.³ ................................................ B60J 1/20
[52] U.S. Cl. .......................................... 296/93; 428/31;
428/217; 428/120; 52/403; 52/400; 49/488;
49/495
[58] Field of Search .................... 428/217, 31, 120;
52/400, 403, 716–718; 49/495, 496, 488; 296/93

[56] References Cited

U.S. PATENT DOCUMENTS 3,292,330 12/1966 Tennison ............................. 52/403
3,378,958 4/1968 Parks et al. ........................ 49/495
3,759,004 9/1973 Kent ................................. 52/716 X
4,165,119 8/1979 Hedeen et al. .................... 52/400 X

FOREIGN PATENT DOCUMENTS 294597 4/1965 Netherlands ........................ 52/717
1013322 12/1965 United Kingdom .
1188504 4/1970 United Kingdom .
1230894 5/1971 United Kingdom .
1259871 1/1972 United Kingdom .

Primary Examiner—Alexander Thomas

[57] ABSTRACT

A window molding for an automobile including a leg embedded in an adhesive for fixing a peripheral edge of a window to a flange of a window opening, according to the invention comprises a lip extending from an inner surface of a head of the molding and joined to an inner peripheral wall of the window opening to inhibit any relative movement between the molding and panels of a vehicle body, thereby preventing any entrance of fine particles such as fine sand and dust therebetween to prevent coating films of the vehicle body from being damaged and any occurrence of rust in the proximity of the window opening.

1 Claim, 6 Drawing Figures

WINDOW MOLDING FOR AUTOMOBILE

This is a continuation of application Ser. No. 210,610, filed Nov. 26, 1980, now abandoned.

BACKGROUND OF THE INVENTION

1. Field of the Invention

The present invention relates to a window molding for an automobile.

2. Description of the Prior Art

With an automobile as shown in FIG. 2, a partial section taken along a line II—II in FIG. 1 and FIG. 3 illustrating in detail a portion encircled by a circle III in FIG. 1, a circumference of a window glass 3 is fixed with an adhesive 4 to a flange 2' of a window opening 2 of a vehicle body 1 depressed from a general surface of the vehicle body 1, and a window molding 5 of a resin has a leg 5a extending through a clearance between an inner peripheral wall 2a of the opening 2 of the vehicle body 1 and an edge of the window glass 3 into the adhesive 4 so as to be fixed thereto, so that its head 5b covers a clearance between the edge of the window glass 3 and the inner peripheral edge of the opening 2 of the vehicle body 1. A reference numeral 6 illustrated a rubber dam. The window molding of this prior art type is disclosed in U.S. Pat. No. 4,165,119 issued Aug. 21, 1979 to General Motors Corporation.

With this arrangement, however, there is a tendency of fine particles such as fine sand or dust to enter between one edge of the head 5b of the window molding 5 and the inner peripheral edge of the window opening 2 in intimate contact therewith. Moreover, the edge of the head 5b of the window molding 5 and the inner peripheral edge of the window opening 2 move relative to each other owing to twist and vibration caused in travelling of a vehicle. Such a relative movement causes the fine particles such as fine sand and dust present between the edge of the head 5b and inner peripheral edge of the window opening 2 to damage coating films of the vehicle body thereat resulting in rust in the proximity of the window opening.

SUMMARY OF THE INVENTION

It is an object of the invention to provide an improved window molding for an automobile, which eliminates all the disadvantages of the prior art.

It is a principal object of the invention to provide a window molding comprising a lip extending from an inner surface of a head of the molding and joined to an inner peripheral wall of a window opening, thereby eliminating any relative movement between the window molding and a vehicle body, and preventing any entrance of fine sand and dust therebetween and hence any rust on coating film surfaces of the vehicle body.

The invention will be more fully understood by referring to the following detailed specification and claims taken in connection with the appended drawings.

DETAILED DESCRIPTION OF THE PREFERRED EMBODIMENT

Figure 4:
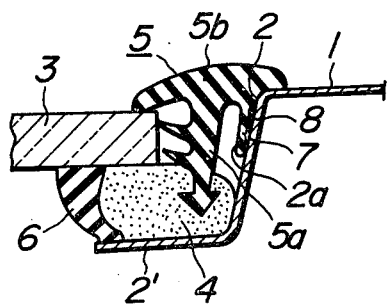
FIG. 4 is a sectional view illustrating one embodiment of a window molding according to the invention.

Referring to FIG. 4 illustrating a first embodiment of the invention, a window molding 5 includes a head 5b whose lower surface is formed with a lip 7 extending along the length of the window molding 5, which is joined to an inner peripheral wall 2a of a window opening 2 of a vehicle body 1 with an adhesive 8 such as a sealing agent or a double-coated adhesive tape.

Figure 5:
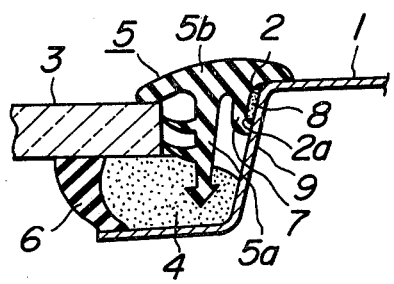
FIG. 5 is a sectional view illustrating another embodiment of the window molding according to the invention.

FIG. 5 illustrates another embodiment of the invention wherein a lip 7 of a window molding 5 is formed at its end on the side of an inner peripheral wall of the opening 2 with a ridge 9 for preventing an adhesive from flowing therefrom, particularly when the adhesive is a sealing agent.

Figure 1:
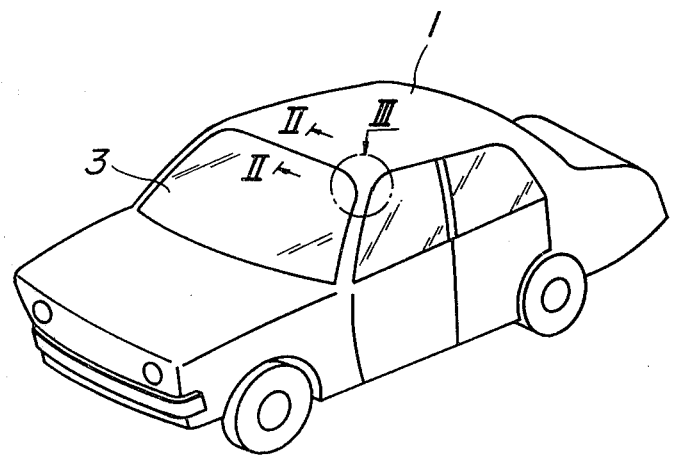
FIG. 1 is a diagrammatic perspective view of an automobile equipped with a window molding as mentioned above.
Figure 2:
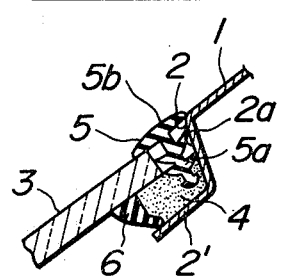
FIG. 2 is a partial sectional view of a window molding taken along a line II—II in FIG. 1 illustrating a prior art molding as mentioned above.
Figure 3:
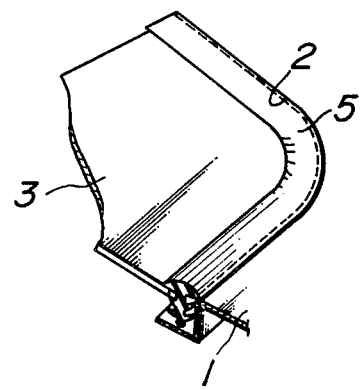
FIG. 3 is a perspective view of a part encircled by a circle III shown in FIG. 1, illustrating the prior art molding as mentioned above.
Figure 6:
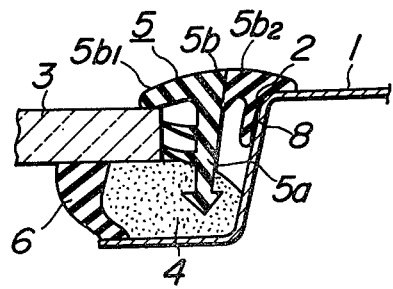
FIG. 6 is a sectional view illustrating a further embodiment of the window molding according to the invention.

FIG. 6 illustrates a further embodiment of the invention. A window molding 5 is molded in two integral parts along its a longitudinal line, that is, an inner compressive portion 5b1 of a relatively hard resin material and an outer stretch portion 5b2 of a soft resin material in relation to that of portion 5b1, thereby enabling the molding 5 to meet snugly with panels of the vehicle body (particularly at corners as shown in FIG. 3), to prevent pleats at the corners as shown in FIG. 3 and hence to obtain a more aesthetical appearance.

As can be seen from the above description, the window molding for an automobile according to the invention comprises a lip extending from the underside of a head of the molding and joined to an inner peripheral wall of a window opening, thereby preventing any relative movement between the molding and panels of a vehicle body and any entrance of fine particles, such as fine sand and dust, between the molding and panels of a vehicle body and hence preventing coating films of the vehicle body from being damaged and any occurrence of rust in the proximity of the window opening.

While the invention has been particularly shown and described with reference to preferred embodiments thereof, it will be understood by those skilled in the art that the foregoing and other changes in form and details can be made therein without departing from the spirit and scope of the invention.

What is claimed is:

1. In combination, a flexible window molding of resin material, and a peripheral wall of a window opening of a vehicle body, said window molding including a head portion for covering a clearance between an edge of a window glass and said wall, said head portion having a leg portion extending therefrom into said clearance in spaced relation to said window glass edge and the peripheral wall of said window opening with the end of said leg portion being embedded in an adhesive for fixing a peripheral edge of the window glass to a flange of said wall, said head portion having a depending lip arranged in spaced parallel relation to said leg portion and adjacent to said peripheral wall of said window opening, an adhesive interposed between said lip and said peripheral wall, said lip terminating in a ridge for engaging said peripheral wall to retain said adhesive, said window molding being composed of two integral portions of different resin materials, a first, compressive portion adjacent said window glass and a second, stretch portion adjacent said wall of a resin material softer than that of said first portion, thereby snugly fitting the window molding to panels of the vehicle body to obtain a more aesthetical appearance.

* * * * *